Aug. 26, 1969      J. MEIER      3,463,258

PRECISION BALANCE

Filed June 30, 1967      3 Sheets-Sheet 1

INVENTOR:
Johann Meier
BY:
Lawrence E. Laubscher
ATTORNEY.

United States Patent Office 3,463,258
Patented Aug. 26, 1969

3,463,258
PRECISION BALANCE
Johann Meier, Stafa, Switzerland, assignor to Mettler Instrumente AG, Zurich, Switzerland, a corporation of Switzerland
Filed June 30, 1967, Ser. No. 650,461
Claims priority, application Switzerland, Nov. 17, 1966, 16,520/66
Int. Cl. G01g *13/14, 23/14*
U.S. Cl. 177—165      7 Claims

ABSTRACT OF THE DISCLOSURE

A precision balance of the type including a balance beam and an optical system for producing a magnified image of indicator scale means connected with one end of said balance beam, characterized by the provision of improved means including a pendulum provided with an objective lens to eliminate the reading errors caused by errors in levelling said balance frame. More particularly, the invention includes auxiliary biasing means connected between the pendulum and the frame for imparting to the pendulum an additional force independent of the force of gravity, thereby to compensate for errors and inconsistencies in the levelling of the balance frame.

---

This invention relates to a precision balance comprising a balance beam fulcrumed on a balance frame, a read-off device for numerically reading off the weight of the article being weighed, including a numbered and graduated measuring plate fastened to one arm of the balance beam and an optical magnifying system having an objective lens for producing a magnified image of that part of the measuring plate which dips in the optical axis of the objective lens, and a taring device having one or more taring springs acting directly or indirectly between the balance beam and the balance frame.

According to the nature of the base on which the balance frame stands, for example a table or a bracket, more or less serious levelling errors will occur in use, and these errors will themselves be subject to uncontrollable fluctuations. If they cause varying inclinations of the balance frame in the direction of the arms of the balance beam, the latter will not maintain its spatial position due to the action of the taring spring. Relative movements will occur between the balance beam and the balance frame, and these relative movements will produce corresponding displacements of the enlarged section of the measuring plate visible on the screen. These displacements, however, are equivalent to reading errors.

The main aim of the invention is to eliminate the above-mentioned reading errors and in a balance of the kind outlined this is achieved, according to the invention, in that a pendulum having the objective lens of said optical magnifying system is pivotally mounted on the balance frame, and means are provided to subject said pendulum to the influence of an additional force acting between it and the balance frame.

Figure 1:
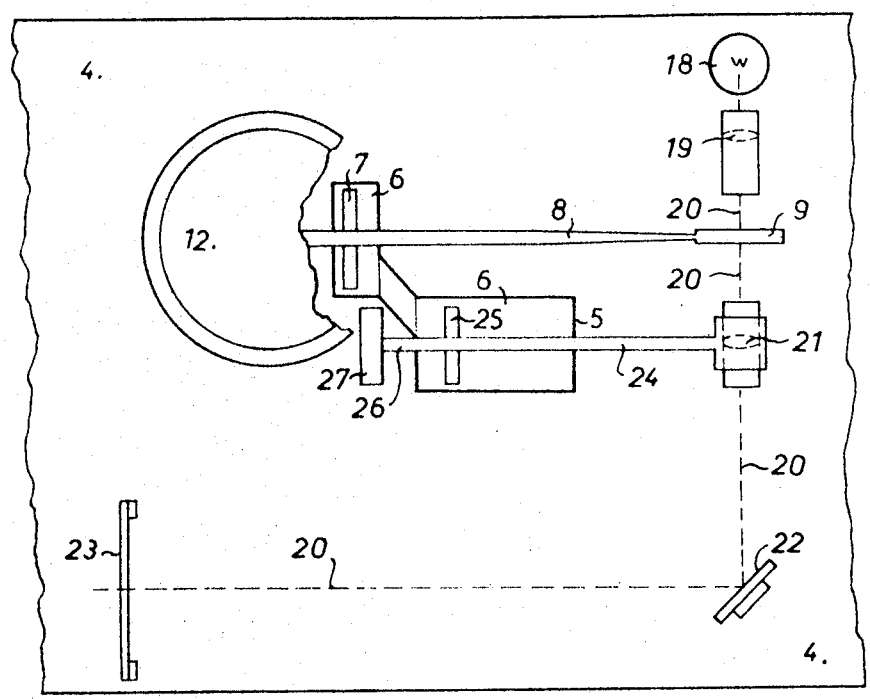
Figure 2:
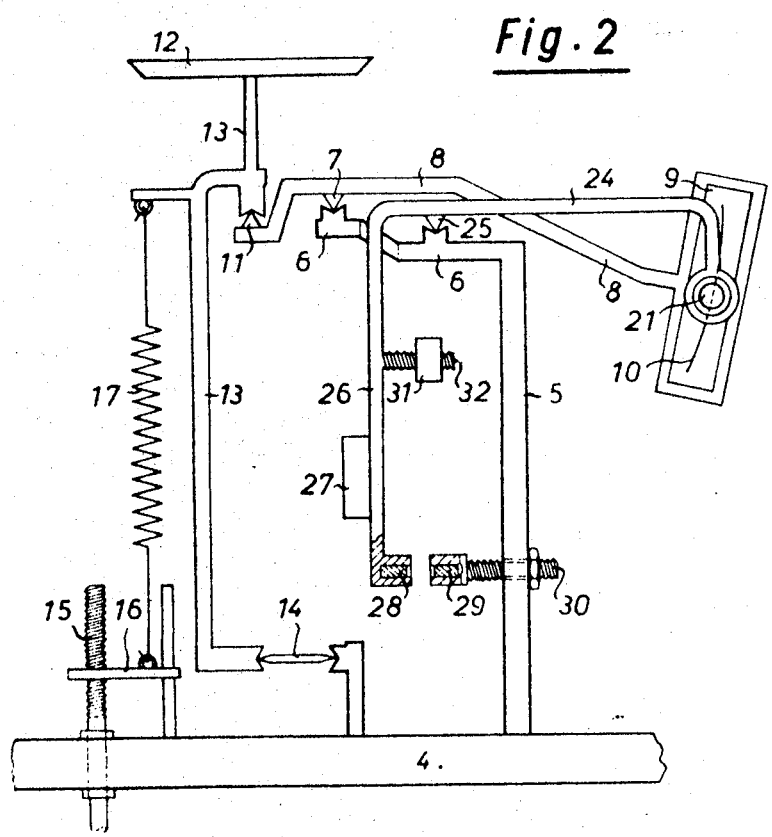
Figure 3:
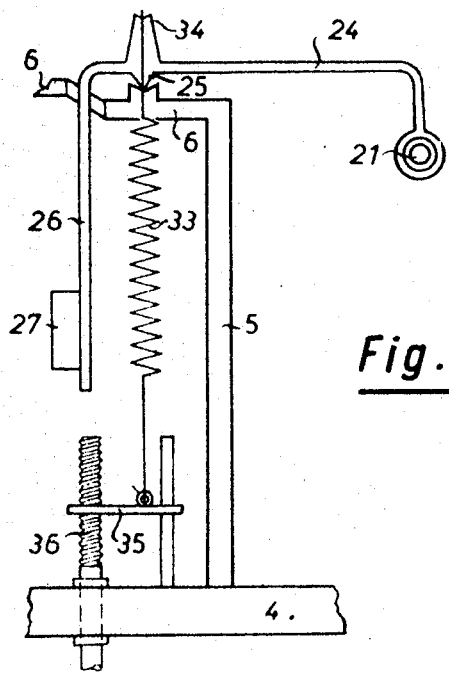

These and other objects and advantages of the invention will best be understood from the following description of specific embodiments when read in connection with the accompanying drawing in which:

FIG. 1 is a simplified plan view of a precision balance, showing in particular the axes of the optical magnifying system together with plan views of the balance beam and of the pendulum having the objective lens, FIG. 2 is a side elevation of the balance corresponding to FIG. 1 and illustrating the taring device and a first embodiment of said pendulum, and FIG. 3 is a side elevation of a second embodiment of said pendulum, the balance beam and the taring device being not illustrated.

The frame 4 of the precision balance has the usual column 5 provided at the top with a projecting head-piece 6. On the head-piece 6 is a bearing in which the central knife 7 of a balance beam 8 is fulcrumed. The longer arm of the balance beam 8 has a measuring plate 9 inscribed with graduating lines and corresponding digits. These graduating lines and digits extend along a pitch-circle 10 having its centre at the knife edge 7. The shorter arm of the balance beam 8 has the usual outer knife 11 (FIG. 2), on which is seated a pan carrier 13 supporting a scale pan 12. The pan carrier 13 may be guided by a parallelogrammatic linkage incorporating a steering lever 14. As illustrated in FIG. 2, the precision balance is further provided with a taring device which comprises a screw spindle 15 rotatably mounted in the frame 4, for adjusting the height of a nut 16, the latter being secured against rotation. A taring spring 17 is stretched between the nut 16 and the pan carrier 13. Instead of the one taring spring 17 a plurality of taring springs may be used, being acted on either in parallel or in series. However, the detailed construction of the taring device 15 to 17 is unimportant; the only essential point is that the balance beam 8 should be directly or indirectly subject to the action of a spring force of which the other point of attack, namely the travelling nut 16, is supported on the frame 4 by way of the rotatable screw spindle 15 as illustrated in FIG. 2.

As further shown in FIG. 1, the precision balance has an optical magnifying system for optically enlarging and projecting the section of the measuring plate 9 located within the optical axis 20. For this purpose a lamp 18 and condenser means 19 are provided on the frame 4, so that the section of the measuring plate 9 located around the optical axis 20 is brightly illuminated. By means of an objective lens 21 and a deflecting mirror 22 the respective section of the measuring plate 9 is optically enlarged and thrown onto a screen 23 attached to the frame 4. This screen may, for example, be a transparent ground glass.

The objective lens 21 is attached to one arm 24 of a two-arm pendulum, the knife 25 of which is fulcrumed on the head-piece 6 of the column 5. The other arm 26 of the pendulum has a counterweight 27 and the pendulum 24 to 27 is constructed so that its centre of gravity is well below its knife 25. In contrast with the conventional application of such a pendulum, the pendulum illustrated has its knife 25 not coaxial with the centre knife 7 of the balance beam 8 but offset both vertically and horizontally therefrom as shown in FIG. 2. The offsetting of the knife 25 from the knife 7 is further carried out so that the effective length of the pendulum arm 24, or in other words the distance between the optical axis of the objective lens 21 and the knife 25, is preferably shorter than the radius of the pitch-circle 10 on the measuring plate 9. If the balance frame 4 is accurately levelled, a plane passing through the knives 7 and 25 should run at least approximately through the optical axis of the objective lens 21. This presupposes that the pitch-circle 10 also at least approximately intersects said optical axis of the objective lens 21.

The pendulum 25 to 27 is not, like conventional pendulums, designed to hang freely merely by gravity; additional means are provided to subject it further to the influence of an additional force acting between the pendulum and the frame 4, this force being adjustable with the aid of adjusting means provided in the frame 4.

In the FIG. 2 embodiment of the pendulum the said additional force is generated by two weak permanent magnets 28 and 29 with opposite poles towards one another. One magnet 28 is attached to the bottom of the arm 26 of the pendulum, while the other magnet 29 is adjustably held to the column 5 by means of the adjusting screw 30. For one of the two magnets 28 or 29 there could be substituted a piece of soft iron acting as an armature; an attractive force would then still be set up between the parts 28 and 29 so as to exert a weak anticlockwise moment on the pendulum 24 to 27. To compensate for this moment the centre of gravity of the pendulum must obviously be displaced into a region at the right hand side of the vertical plane passing through the knife 25. The necessary adjustment is made with a screw-threaded weight 31 adapted to move along a screw spindle 32 fixed in the arm 26 of the pendulum. However, the weight 31 serves only to adjust the predetermined position of equilibrium of the pendulum 24 to 27 when the balance frame 4 is accurately levelled.

In the FIG. 3 embodiment of the pendulum, on the other hand, the position of equilibrium of the pendulum 24 to 27 is independent of the size of the additional force applied when the balance frame 4 is levelled. This is achieved by directing the additional force through the knife 25, provided the frame 4 is levelled as indicated above. For this purpose the top end of a tension spring engages an extension 34 of the pendulum vertically above the knife 25. The lower end of this tension spring 33 is suspended in an adjustment member 35, the vertical position of which can be regulated by means of the screw spindle 36 rotatably mounted in the frame 4. The arrangement is such that when the frame 4 is exactly levelled and the pendulum 24 to 27 is in the position of equilibrium the tension spring 33 generates an additional force which pulls downwards in a vertical direction. With the pendulum in a state of equilibrium no torque can then be exerted by the spring 33. The torque arises only when the pendulum is brought out of equilibrium. This happens as soon as the balance frame 4 is tilted out of its horizontal position.

In explaining the mode of operation it is best to start with the balance frame 4 in its levelled position, in which the pendulum 24 to 27 shown in FIGS. 2 or 3 as in the state of equilibrium, while the balance beam 8 may have any inclination, which will be counted as a starting position. The section of the measuring plate 9 then located within the optical axes 20 will accordingly be reproduced on the screen 23. If—at given constant loading of the scale pan 12 and at unchanged setting of the taring device 15 to 17—the balance frame 4 is tilted out of its levelled position through a small angle $\alpha$, then the beam 8 will swing back through an angle $\beta$ and the pendulum 24 to 27 through an angle $\gamma$, the angles $\gamma$ and $\beta$ being counted in relation to the balance frame 4. The angle $\beta$ depends on the proportion by which the taring spring 17 influences the sensitivity of the whole balance. On the basis of a taring device according to FIG. 2, the angle $\beta$ will always be less than the angle $\alpha$. The angle $\gamma$ on the other hand is dependent on the size of the additional force and on the manner in which this force acts on the pendulum 24 to 27. If the additional force is generated by one or two permanent magnets 28 to 29 as shown in FIG. 2, or by a spring 33 as illustrated in FIG. 3, a weak tilting moment will be effected at the pendulum 24 to 27. This tilting moment in turn will amplify any swing of the pendulum once such a swing has been initiated. For this reason the angle $\gamma$ will always be correspondingly larger than the angle $\alpha$. By suitably regulating the additional force by means of the adjusting screw 30 (FIG. 2) or 36 (FIG. 3) one can thus so adjust the proportionality factor obviously present between the angle $\beta$ and the angle $\gamma$, that the section of the measuring plate 9 visible on the screen 23 is not displaced when the balance frame 4 is tilted through smaller angles $\alpha$. If this desired mode of operation is to be achieved the equation $r \cdot \gamma = R \cdot \beta$ must at least approximately be fulfilled, $r$ being the effective length of the pendulum arm 24 or the distance between the optical axis of the objective lens 21 and the knife 25, and R being the radius of the pitch circle 10 having its centre in the knife 7. The above mentioned equation is only a first approximation because the detailed construction of the optical magnifying system 18 to 23, and particularly its linear enlargement factor, has to be taken into account. But if this linear enlargement factor has a high value, within the usual 50 to 100 range, the equation will be accurate down to an error of 1 to 2%.

It also follows from the equation that the effective length $r$ of the arm 24 of the pendulum can be made considerably smaller than the radius R of the pitch circle 10 on the measuring plate 9, provided that the angle $\gamma$ is made larger than the angle $\beta$ by suitably adjusting the additional force acting on the pendulum 24 to 27. With such a construction of the pendulum a considerable amount of space will be saved, and the whole pendulum 24 to 27 can then be accommodated in the space to the side of the longer arm of the balance beam 8, as particularly shown in FIG. 1. This provides the opportunity to construct the pendulum 24 to 27 as a separate additional unit which can subsequently be fitted into an existing precision balance.

What is claimed is:

1. In a precision balance including a balance frame, a balance beam fulcrumed on said frame, a measuring plate connected with one arm of said beam, an optical magnifying system having an objective lens for producing a magnified image of that part of the measuring plate which traverses the optical axis of said lens, and taring means including at least one taring spring connected between said balance beam and said balance frame; the improvement which comprises a pendulum pivotally connected with said frame for movement by gravity, said objective lens being connected with said pendulum for movement thereby relative to the axis of said optical system; and auxiliary biasing means connected between said pendulum and said frame for applying to said pendulum independently of the force of gravity an additional force pivotally biasing said pendulum in a given direction relative to the frame, thereby to eliminate the reading error caused by an error in the levelling of the balance frame.

2. A precision balance as defined in claim 1, wherein said auxiliary biasing means include an adjustment device mounted on the balance frame for regulating said additional force.

3. A precision balance as defined in claim 1, wherein said auxiliary biasing means include a permanent magnet for generating said additional force.

4. A precision balance as defined in claim 1, wherein said auxiliary biasing means include a spring for generating said additional force.

5. A precision balance as defined in claim 1, wherein said pendulum is accommodated in a space laterally adjacent the arm of the balance beam provided with said measuring plate.

6. A precision balance as defined in claim 1, wherein the pivotal axis of said pendulum is displaced both horizontally and vertically from the pivotal axis of said balance beam.

7. A precision balance as defined in claim 1, wherein the distance between the optical axis of said objective lens and the pivotal axis of said pendulum is less than radius of the pitch-circle on said measuring plate.

References Cited

UNITED STATES PATENTS

| | | | |
|---|---|---|---|
| 3,150,730 | 9/1964 | Baur | 177—178 |
| 3,193,030 | 7/1965 | Meier | 177—164 |
| 3,207,243 | 9/1965 | Baur | 177—178 |

RICHARD B. WILKINSON, Primary Examiner

G. H. MILLER, Jr., Assistant Examiner

U.S. Cl. X.R.

177—178